Sept. 9, 1952  H. GRANDGIRARD  2,610,094
ARTICULATION OF TRACK LINKS OF ENDLESS TRACKS
Filed Jan. 10, 1946  2 SHEETS—SHEET 1

Inventor
H. Grandgirard

Sept. 9, 1952  H. GRANDGIRARD  2,610,094
ARTICULATION OF TRACK LINKS OF ENDLESS TRACKS
Filed Jan. 10, 1946
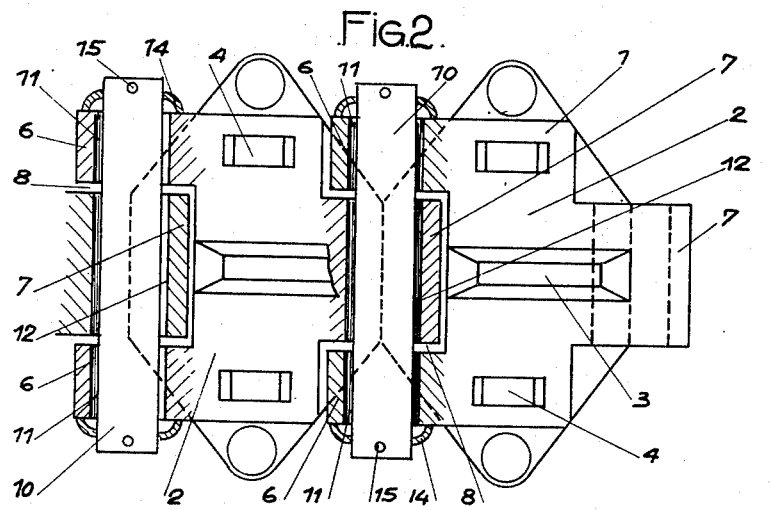
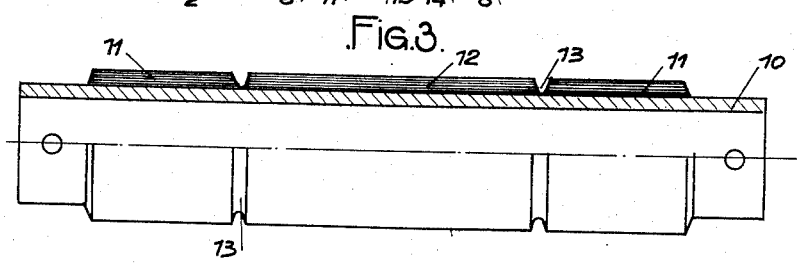
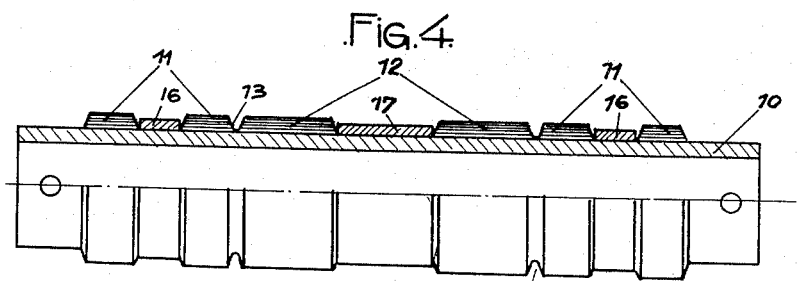
Inventor
H. Grandgirard Patented Sept. 9, 1952

2,610,094

UNITED STATES PATENT OFFICE 2,610,094

ARTICULATION OF TRACK LINKS OF ENDLESS TRACKS

Henri Grandgirard, Puteaux, France, assignor to Societe des Brevets Kegresse, S. E. K., Paris, France, a French corporation Application January 10, 1946, Serial No. 640,322
In France August 23, 1943

Section 1, Public Law 690, August 8, 1946
Patent expires August 23, 1963

1 Claim. (Cl. 305—10)

This invention relates to the articulation of track links of endless tracks. In metallic endless treads with links the most difficult problem to solve has always been that of the articulation of the track links.

When axles are employed, special treated steels have to be used having high precision machining and the greasing of the bearings must be ensured as well as their protection against the admission of water and dust so as to reduce wear and tear as far as possible.

The production of such articulations is most costly and if this high cost is justified for endless treads which are to equip special vehicles it is not compatible with the manufacture of small or medium power tractors such as those required in civil life by the farmer in particular.

The present invention relates to the production of an articulation of endless tread links of which the machining cost is low and not requiring the use of any special steel.

Other features of this invention will be made evident in the following description and by reference to the accompanying drawings which show one embodiment of this invention:

Figure 2 is a plan view of Figure 1 with section through the articulations.

Figure 3 illustrates a form of pin or axle embodied with the link arrangement of Figures 1 and 2.

Figure 4 illustrates partly in section and partly in elevation a modified pin or axle construction.

Figure 1:
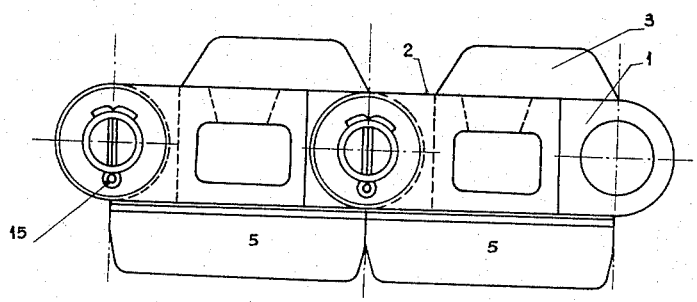
Figure 1 is a view in elevation of a portion of the endless tread.
Figure 5:
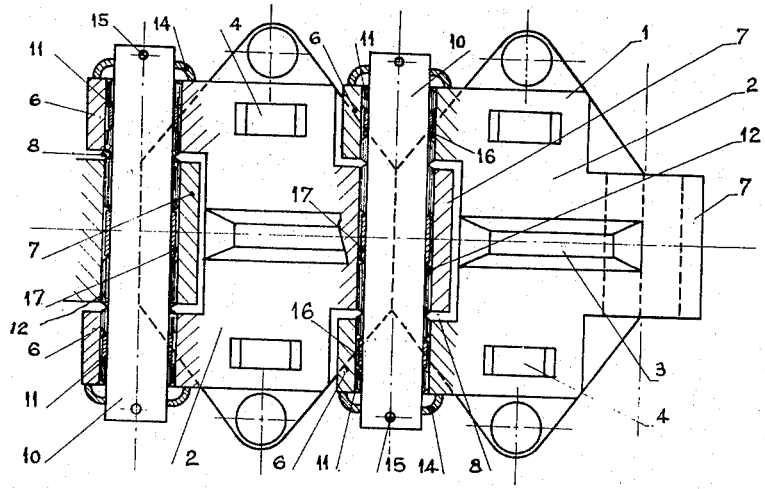
Figure 5 is a view similar to Figure 2 but incorporating the axle construction of Figure 4.

The track links 1 of the endless tread (Figures 1, 2 and 5) are of the usual form with the runner path 2 for the carrier rollers of the vehicle, the lateral guide ribs 3, the chambers 4 for receiving the driving cogs or teeth and the blocks or shoes 5 which contact the ground during the operation of the vehicle embodying the endless tread.

Each track link is furnished at its end with the eyelets 6 and 7 bored to receive the articulation axles or pins and arranged in such manner as to engage overlapping one into the other with only slight clearance as shown at 8, upon the assembling of the endless tread.

The axles, Figures 2 to 5 inclusive, are constituted by a bar or drawn steel tube 10 of usual quality without machining, the section of which is calculated so as to resist the shearing caused by the tractive stresses of the endless tread and to which are secured rubber or other resilient rings 11 and 12 corresponding respectively to the eyes 6 and 7 of the track links; these rings according to the present invention are separated by grooves 13 of suitable shape. The movement of the axles in the axial direction is limited by the washers 14 and the cotter pins 15, Figure 2.

For the assembling of the track links the bores of the eyes 6 and 7 having been made without any high precision, even simply by the use of a drill, to a diameter slightly less than that of the rings 11 and 12 of the axles, and the eyes having been placed longitudinally to ensure the lateral play or clearance 8, the axles already equipped with the rings are shrunk on under pressure. For this operation and according to another characteristic of the present invention the track links are turned in relation to each other in such manner that when the number of track links required for the endless tread have been obtained, the latter appears when at rest in the form of a circle; then the axles are secured by the washers 14 and the pins 15.

Having assembled the links of the endless tread in a circular form and bonded the links together by the rings 11 and 12 in this angular relation it is evident that when the tread is applied to use in the usual manner by engaging opposed portions thereof over the drive wheels the elastic rings of certain of the links are stressed in one direction while the rings of another group of links are stressed in the opposite direction. In other words, the links are initially assembled and bonded together by the rings in relative angular positions which are intermediate the two extreme angular positions which the links assume while in operation. This is due to the fact that the links constituting the upper and lower straight portions of the endless tread are turned out of the initial angular position in one direction when applied to use while other links of the endless tread in being applied to the relatively small radius of the drive wheels are turned out of the original angular position in the opposite direction.

The rings 11 and 12 have their inner surfaces bonded to the steel axle and their outer surfaces bonded with the eyes of the links. The outer rings 11 being bonded with the eyes 6 of one track link and the central ring 12 being bonded with the eye 7 of the adjacent track link due to the manner of joining the pins with the eyes.

As above stated, the links are assembled to provide between each of them an angular displacement such as they undergo in the straight portions of the endless track an angular displacement in a certain direction and that, when they are wound on the end pulleys, they undergo an angular displacement in the other direction, but of the same magnitude. This reduces by half the deformation which the elastic ring undergoes as compared to the case in which the ring is at rest when the links of the endless track are on the straight portion. Moreover, since the middle rings as well as the end rings are all integral with the shaft, the deformation of their material, when two consecutive links take a certain relative inclination, is exerted in one direction for the middle ring and in the other direction for the two external rings. It is obvious therefore that the deformation is distributed in both directions and that it is half of what it would be if the deformation were to be exerted wholly in the same direction.

The tractive stresses upon the endless tread will cause deformation of the resilient substance of the rings 11 and 12, such deformation conferring upon the unit a certain flexibility in the longitudinal direction, protecting the entire mechanism of the vehicle against too violent jerks.

In certain applications where during the course of working of the endless treads, there appear momentary stresses much greater than the normal stress, the deformation of the resilient substance should be limited. This is effected by constituting the rings in spaced pairs so that on each pin or axle 10 there are provided spaced pairs of rings 11 for cooperation with the eyes 6 and central pairs of rings 12 for cooperation with the eyes 7. Between the rings of each pair there are provided metal rings 16 and 17 respectively of smaller external diameter than the diameter of the bores of the eyes 6 and 7 and the external diameter of the rings 11 and 12 and which metal ring will limit deformation or crushing of the resilient rings in the event of extremely high tractive stresses.

It will be understood that apart from the silence, elasticity and absence of wear and tear and upkeep ensured by the use of the rings 11 and 12, the introduction of these latter between the axles and their fixing eyes allows of shrinking on these axles already carrying the rings, without requiring any precision machining of either the axles or the eyes.

The existence of the grooves 13 avoids excessive work for the resilient substance of the rings between the zones where they are pulled by torsion in inverse direction. These grooves may moreover be provided after the fixing upon the axle of one single bush and may affect a greater or smaller thickness of the rings.

It will be understood that the circular mounting of the endless tread, by limiting yet further the molecular action of the substance of the rings 11 and 12, also contributes to reducing the fatigue of the same and prolongs their life.

It is evident that many constructional modifications could be made in the arrangements described without thereby falling outside the scope of the present invention.

Thus it would be possible to provide, upon the external surface of the rings, longitudinal deformations or grooves corresponding to housings of the same shape in the eyes to increase the adherence of the rings in the latter.

The number of eyes 6, 7, may also be selected greater than three for each articulation axle.

Having now particularly described and ascertained the nature of my said invention and in what manner the same is to be performed, I declare that what I claim is:

In a track for vehicles, rigid metallic links, provided with eyes and articulation axles for the links engaged in said eyes, the axles being each formed by a rough drawn bar, furnished with rings consisting of resilient material, a pair of rings corresponding to an eye of the track links, these rings being stuck and vulcanized on to the axle before its assembly, a metal ring of smaller external diameter, placed between both rings of each pair, and limiting their crushing in the case of very high tractive stresses.

HENRI GRANDGIRARD.

REFERENCES CITED

The following references are of record in the file of this patent:

UNITED STATES PATENTS

| Number | Name | Date |
|---|---|---|
| 1,970,568 | Knox | Aug. 21, 1934 |
| 2,059,247 | Knox | Nov. 3, 1936 |
| 2,234,927 | Kubaugh | Mar. 11, 1941 |